US006945422B2

(12) United States Patent
Beyer et al.

(10) Patent No.: US 6,945,422 B2
(45) Date of Patent: Sep. 20, 2005

(54) IN-TANK FUEL LINE QUICK CONNECTOR ASSEMBLY

(75) Inventors: Sharon Elizabeth Beyer, Grand Blanc, MI (US); Ulf Sawert, Grand Blanc, MI (US); Douglas James Golla, Le Vesinet (FR); Matthew L. Catlin, Flushing, MI (US); William Stuart Zimmerman, Grand Blanc, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/947,945

(22) Filed: Sep. 6, 2001

(65) Prior Publication Data

US 2002/0053567 A1 May 9, 2002

Related U.S. Application Data

(60) Provisional application No. 60/246,874, filed on Nov. 8, 2000.

(51) Int. Cl.[7] .................... B65D 90/00
(52) U.S. Cl. .................... 220/562; 220/4.14
(58) Field of Search .................... 220/562, 4.14; 285/319, 921

(56) References Cited

U.S. PATENT DOCUMENTS 4,035,005 A * 7/1977 DeVincent et al. ......... 285/319
4,451,069 A * 5/1984 Melone .................... 285/86
4,923,228 A * 5/1990 Laipply .................... 285/319
4,991,882 A * 2/1991 Gahwiler .................... 285/319
5,064,227 A * 11/1991 Spors et al. .................... 285/319
5,181,839 A * 1/1993 Tuckey .................... 285/316
5,542,712 A 8/1996 Klinger et al.
5,711,552 A * 1/1998 Hogue et al. .................... 285/319
5,772,263 A 6/1998 Lewis

FOREIGN PATENT DOCUMENTS

| DE | 19747959 | 5/1999 |
|---|---|---|
| EP | 0529758 | 3/1993 |

* cited by examiner

*Primary Examiner*—Joseph C. Merek
(74) *Attorney, Agent, or Firm*—Jimmy L. Funke

(57) ABSTRACT

An in-tank fuel line quick connector assembly for a fuel tank in a vehicle including a first member adapted to be disposed inside of the fuel tank and having a projection extending outwardly. The in-tank fuel line quick connector assembly also includes a second member adapted to be disposed inside of the fuel tank and having a cavity to receive the projection. The in-tank fuel line quick connector assembly further includes a seal ring disposed in the cavity to engage the first member. The second member has opposed latches adjacent the cavity and being movable to engage the projection for retaining the first member and the second member together.

20 Claims, 3 Drawing Sheets

10
30
36
32
34
60
62
46
40
39
38
42
43
44
50
54
58
52
56

IN-TANK FUEL LINE QUICK CONNECTOR ASSEMBLY

CROSS-REFERENCE TO RELATED APPLICATION(S)

The present invention claims the priority date of copending U.S. Provisional Patent Application Ser. No. 60/246,874, filed Nov. 8, 2000.

TECHNICAL FIELD

The present invention relates generally to fuel tanks for vehicles and, more particularly, to an in-tank fuel line quick connector assembly for a fuel tank of a vehicle.

BACKGROUND OF THE INVENTION

It is known to provide a fuel tank for a vehicle to hold fuel to be used by an engine of the vehicle. In some vehicles, the fuel tank includes a fuel pump module disposed therein with a removable cover sealed to the top of the fuel tank having an electrical connector and a fuel line outlet connector. The fuel pump module includes a fuel reservoir and an electrical fuel pump disposed in the reservoir.

Quick connect fittings have been used in fuel systems to make connections external to the fuel tank. Inside the fuel tank, hydraulic connections have been made using hoses and clamps or by press fitting polymer tubes onto various end-forms, the most common one referred to a as a “fir tree” connection. As more and more components of the fuel tank such as regulators, filters, and valves are installed inside the fuel tank in order to meet tighter emission standards, there is a need to use quick connect fittings to make (hydraulic) liquid connections without the use of tooling.

Quick connect fittings used outside of the fuel tank have specific performance requirements which include that the connection be leak free under all conditions and temperatures. The quick connect fitting must prevent separation of a connection between the connector and the tubing to which it is assembled. Because of these requirements, the connector is longer than what it needs to be for the inside of the fuel tank. For example, the space required by O-rings and glands as well as the need for barbs to ensure the retention of the quick connect fitting to polymer tubes create an undesirable length. Further, additional space is needed to allow a release tool to be inserted. Inside the fuel tank, space (length) is at a premium, and the smaller a component can be made, the easier it is to work into the design.

Therefore, it is desirable to provide a new quick connector to be used inside of a fuel tank for a vehicle. It is also desirable to provide an in-tank fuel line quick connector for a fuel tank in a vehicle that has a smaller size. It is further desirable to provide an in-tank fuel line quick connector for a fuel tank in a vehicle that reduces the number of parts and cost.

SUMMARY OF THE INVENTION

It is, therefore, one object of the present invention to provide a new quick connector assembly for inside of a fuel tank in a vehicle.

It is another object of the present invention to provide an in-tank fuel line quick connector assembly for a fuel tank in a vehicle.

To achieve the foregoing objects, the present invention is an in-tank fuel line quick connector assembly for a fuel tank in a vehicle including a first member adapted to be disposed inside of the fuel tank and having a first projection extending outwardly. The in-tank fuel line quick connector assembly also includes a second member adapted to be disposed inside of the fuel tank and having a cavity to receive the first projection. The in-tank fuel line quick connector assembly further includes a seal ring disposed in the cavity to engage the first member. The second member has opposed latches adjacent the cavity and are movable to engage the projection for retaining the first member and the second member together.

One advantage of the present invention is that an in-tank fuel line quick connector assembly is provided for inside of a fuel tank of a vehicle. Another advantage of the present invention is that the in-tank fuel line quick connector assembly reduces the size of the package and space needed for the insertion of a removal tool to meet space constraints inside of the fuel tank. Yet another advantage of the present invention is that the in-tank fuel line quick connector assembly reduces the number of components needed to seal the connection and the insertion force of the male to female quick connect fittings. Still another advantage of the present invention is that the in-tank fuel line quick connector assembly simplifies the assembly process as it can be installed by hand. A further advantage of the present invention is that the in-tank fuel line quick connector assembly reduces cost because it can be assembled by an operator without the use of a mechanical assist and the function is accomplished with the addition of one molded part and an o-ring. Yet a further advantage of the present invention is that the in-tank fuel line quick connector assembly has added value because it allows for serviceability of the components within the fuel module.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
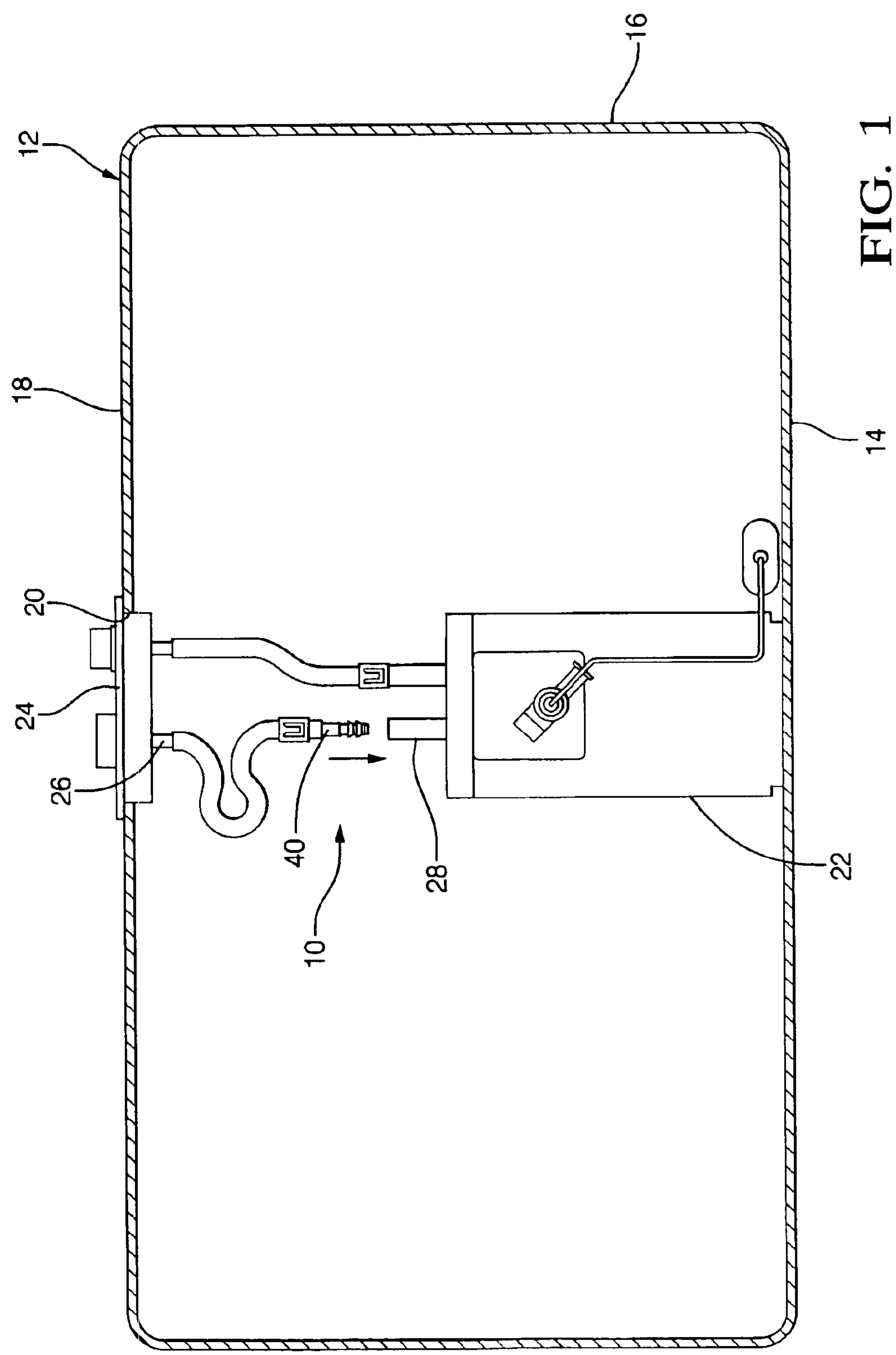
FIG. 1 is a fragmentary elevational view of an in-tank fuel line quick connector assembly, according to the present invention, illustrated in operational relationship with a fuel tank of a vehicle.

Referring to the drawings and in particular FIG. 1, one embodiment of an in-tank fuel line quick connector assembly 10, according to the present invention, is shown for a fuel tank, generally indicated at 12, in a vehicle (not shown). In this embodiment, the fuel tank 12 is of a generally rectangular type. The fuel tank 12 has a bottom wall 14. The fuel tank 12 also has a side wall 16 around a periphery of the bottom wall 14 and extending generally perpendicular thereto. The fuel tank 12 has a top wall 18 around a periphery of the side wall 16 and extending generally perpendicular thereto. The top wall 18 includes at least one opening 20 therein. The fuel tank 12 includes a fuel pump module 22 disposed therein with a removable fuel tank cover 24 disposed in the opening 20 and sealed to the top wall 18 of the fuel tank 12. The fuel tank cover 24 has an electrical connector (not shown) and a fuel line outlet connector 26 extending therethrough. The fuel pump module 22 also includes a return fuel member 28 extending upwardly. The return fuel member 28 is tubular and has a generally circular cross-sectional shape. The return fuel member 28 has a passageway (not shown) extending axially therethrough. The return fuel member 28 is integral and formed as one-piece with the fuel pump module 22. It should be appreciated that, except for the in-tank fuel line quick connector assembly 10, the fuel tank 12 is conventional and known in the art.

The in-tank fuel line quick connector assembly 10 includes a male fitting or first member 30 having a tubular configuration. The first member 30 has an exterior surface 32 with an annular projection or retaining bead 34 extending radially outwardly therefrom and spaced from one end thereof. The first member 30 also has a locking bead 36 extending radially and spaced axially between the retaining bead 34 and the end thereof. The locking bead 36 extends radially a distance greater than the retaining bead 34. The first member 30 further has a reduced diameter end 38 extending axially from the retaining bead 34. The first member 30 also has a passageway 39 extending axially therethrough. The first member 30 is made of a rigid material such as a plastic material and has a predetermined diameter and wall thickness. It should be appreciated that the first member 30 may be made of any suitable material, diameter, and wall thickness. It should also be appreciated that a hose 39*a* interconnects the end of the first member 30 and the fuel line outlet connector 26.

The in-tank fuel line quick connector assembly 10 also includes a female fitting or second member 40 for connection to the first member 30. The second member 40 has a housing or body 42 extending axially. The body 42 is generally cylindrical and has a connector portion 43 extending axially with a plurality of barbs 44 at one end. The barbs 44 extend radially and are annular and spaced axially for insertion into the return fuel member 28 of the fuel pump module 22. Preferably, the second member 40 is made of a fuel resistant polymer material such as POM (Acetal) that is unfilled or filled with a low percentage of glass or carbon fiber. It should be appreciated that the polymer material has material properties such that it can be used in snap fit designs.

The second member 40 includes a cavity 46 extending axially therein at the other end. The cavity 46 has an inner surface 48 and receives the reduced diameter end 38 and retaining bead 34 of the first member 30. The second member 40 also has a passageway 50 extending axially through the body 42 to the other end thereof and communicates with the cavity 46. The second member 40 has a pair of opposed flex arms or latches 52 on the body 42 and located radially adjacent the cavity 46. The flex arms 52 have a first edge 54 and a second edge 56 axially spaced from the first edge 54. The first edge 54 is molded as integral part of the body 42. The body 42 includes an aperture 58 extending radially therethrough around the sides and second edge 56 of the flex arms 52 to allow the flex arms 52 to flex via the first edge 54. It should be appreciated that the flex arms 52 extend into the apertures 58 from the first edge 54 and are integral with the body 42 retain the first member 30 when pressed into it.

The in-tank fuel line quick connector assembly 10 also includes a seal 60 disposed in the cavity 46 for engaging the first member 30 and providing sealing between the body 42 and the first member 30. Preferably, the seal 60 is made of an elastomeric material. The seal 60 is annular. The seal 60 has a generally circular cross-section. The seal 60 is disposed about the reduced diameter end 38 of the first member 30 and sandwiched between the retaining bead 34 and a shoulder 62 of the body 42 extending into the cavity 46. It should be appreciated that the seal 60 resists leakage of fluid between the first member 30 and second member 40.

Figures 2, 3:
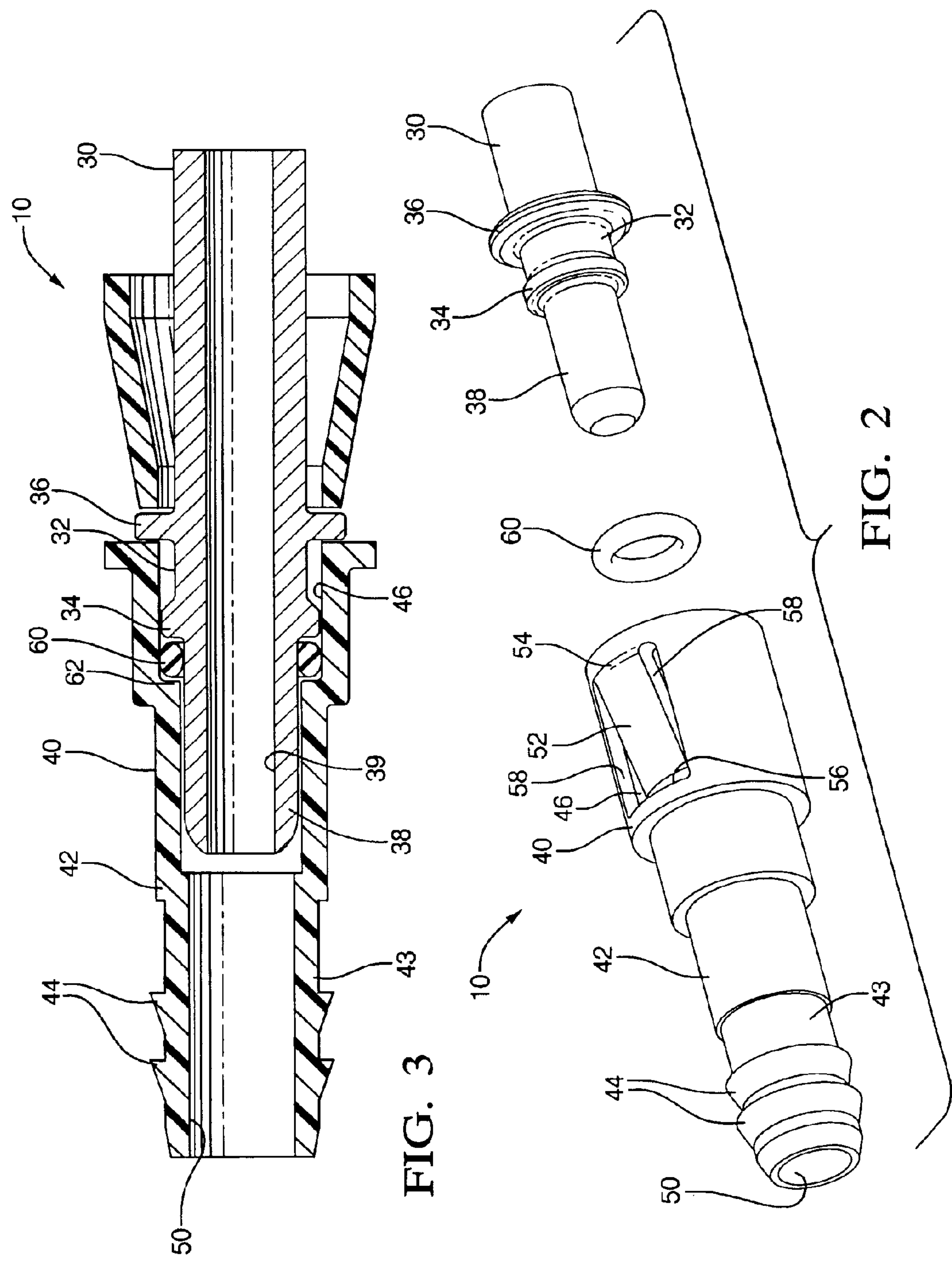
FIG. 2 is an enlarged exploded perspective view of the in-tank fuel line quick connector assembly of FIG. 1.
FIG. 3 is a fragmentary elevational view of the in-tank fuel line quick connector assembly of FIG. 1.

Referring to FIG. 3, the in-tank fuel line quick connector assembly 10 is shown assembled in a connect position. The seal 60 is disposed in the cavity 46. The first member 30 engages the seal 60 and is disposed in the cavity 46 of second member 40 and about the first member 30. The connection between the body 42 and the first member 30 is made when during insertion, the locking bead 36 on the first member 30 flexes the flex arms 52 outward and the second edge 56 of each flex arm 52 drops down on the backside of the locking bead 36.

To release the first member 30 from the second member 40, a tool such as a sleeve (not shown) is moved axially by an operator toward the second member 40. The axial end of the sleeve engages the flex arms 52. The flex arms 52 are expanded to a release position. The first member 30 is then moved axially by an operator away from the second member 40 to remove the first member 30 from the cavity 46 of the second member 40. It should be appreciated that once the first member 30 is removed, the flex arms 52 return to their original position.

Figure 4:
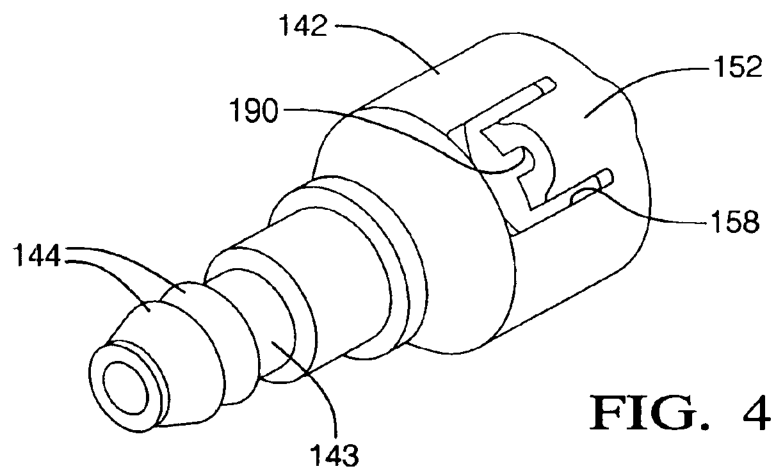
FIG. 4 is a perspective view of another embodiment, according to the present invention, of the in-tank fuel line quick connector assembly of FIG. 1.

Referring to FIG. 4, another embodiment, according to the present invention, of the body 42 of the in-tank fuel line quick connector assembly 10 is shown. Like parts have like reference numerals increased by one hundred (100). In this embodiment, the body 142 has only two barbs 144 on the connector portion 143 onto which the interface of either a flexible tubing (not shown) or fuel return member 30 is pressed onto to save space. The application of this connector assembly 10 is intended specifically for the inside of the fuel tank 12 where no forces other than the force created by the hydraulic pressure acting on the inside of the tubing can pull the tubing and the body 142 apart.

Figure 5:
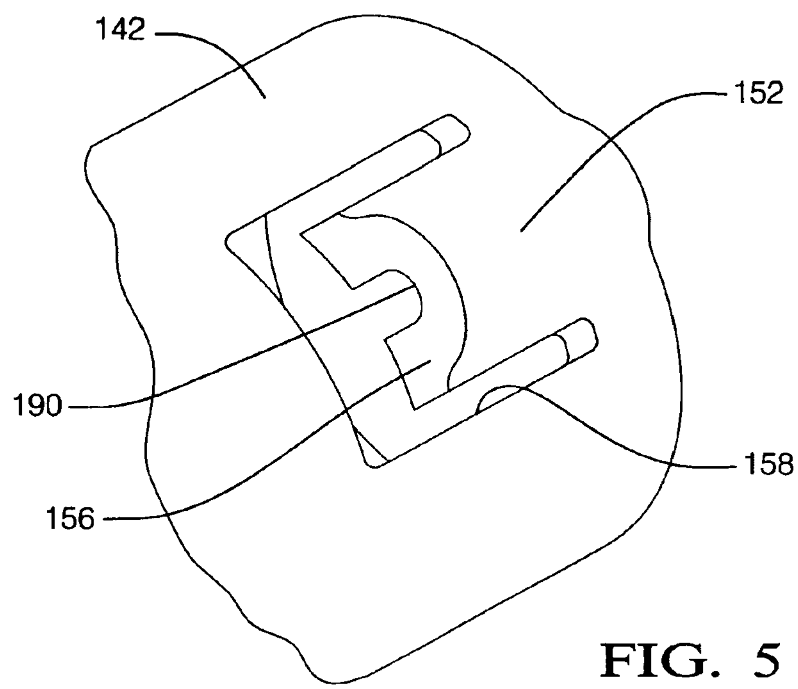
FIG. 5 is an enlarged perspective view of a portion of the in-tank fuel line quick connector assembly of FIG. 4.

Referring to FIGS. 4 and 5, one of the retaining latches or flex arms 152 is illustrated on the body 142. The second edge 156 of the flex arm 152 is the edge, which in combination with the locking bead 36 provides the retention of the first member 30 and second member 40. The second edge 156 has a slot 190 that allows for the insertion of a tool (not shown) such as pins of a snap ring pair of pliers. When the pins of the snap ring pliers are inserted in the direction of the arrow into the slots 190, and the pliers are activated, the flex arms 152 flex outward and the connection between the first member 30 and second member 40 are released, and the two can be separated.

Figure 6:
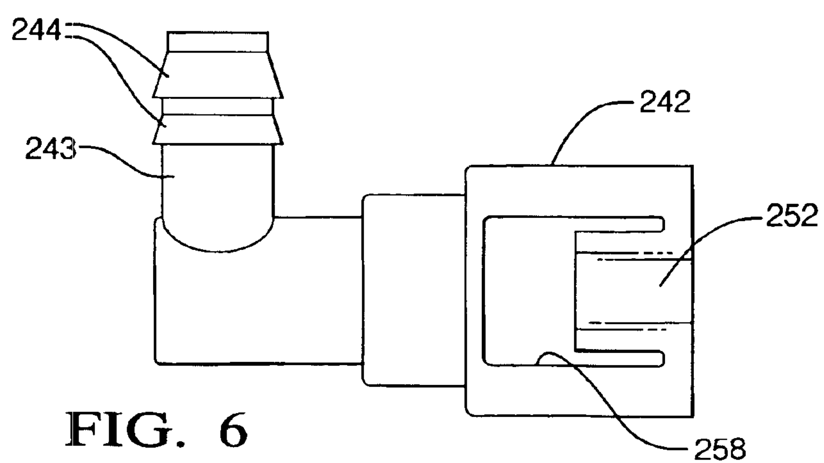
FIG. 6 is a perspective view of yet another embodiment, according to the present invention, of the in-tank fuel line quick connector assembly of FIG. 1.

Referring to FIG. 6, yet another embodiment, according to the present invention, of the body 42 of the in-tank fuel line quick connector assembly 10 is shown. Like parts have like reference numerals increased by two hundred (200). In this embodiment, the body 242 has the connector portion 243 with the barbs 244 at an angle such as forty-five or ninety degrees to the remainder of the body 242. As illustrated, the connector portion 243 is at an angle of ninety degrees relative to the remainder of the body 242. It should be appreciated that the smaller package size of this design is accomplished by reducing the number of barbs 244 at the tube to body interface, by reducing the number of o-rings from two to one, and by eliminating the need to provide insertion room for a removal tool.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel tank assembly comprising:

a fuel tank;

a first member disposed inside of said fuel tank and having a first projection extending outwardly and a second projection extending outwardly and spaced axially between said first projection and one end thereof;

a second member disposed inside of said fuel tank and having a cavity to receive said second projection;

a seal ring disposed in said cavity between said second projection and a shoulder of said second member forming a bottom of said cavity to engage said first member;

said first member having a reduced diameter end extending axially from said second projection and axially past the shoulder of said second member; and said second member having opposed apertures and latches extending into said apertures adjacent said cavity and being movable to engage said first projection for retaining said first member and said second member together.

2. A fuel tank assembly as set forth in claim 1 wherein each of said latches have a first edge and a second edge, said first edge being attached to said second member and said second edge to engage and disengage said first projection.

3. A fuel tank assembly as set forth in claim 2 wherein said latches and said second member are integral.

4. A fuel tank assembly as set forth in claim 1 wherein said second member has a body and a connector portion extending from said body.

5. A fuel tank assembly as set forth in claim 4 wherein said connector portion is disposed at an angle to a remainder of said body.

6. A fuel tank assembly as set forth in claim 5 wherein said angle is between approximately forty-five degrees and approximately ninety degrees.

7. A fuel tank assembly as set forth in claim 4 wherein said connector portion has a plurality of barbs.

8. A fuel tank assembly as set forth in claim 7 wherein said plurality of barbs comprises two.

9. A fuel tank assembly as set forth in claim 1 wherein said second member is molded of a polymer material.

10. A fuel tank assembly as set forth in claim 1 wherein said second member has a passageway communicating with said cavity.

11. A fuel tank assembly as set forth in claim 4 wherein said connector portion extends axially from said body.

12. A fuel tank assembly comprising:

a fuel tank;

a first member disposed inside of said fuel tank and having a first projection extending outwardly and a second projection extending outwardly and spaced axially between said first projection and one end thereof;

a second member disposed inside of said fuel tank and having a cavity to receive said second projection;

a seal ring disposed in said cavity and sandwiched between said second projection and a shoulder of said second member forming a bottom of said cavity to engage said first member;

said first member having a reduced diameter end extending axially from said second projection and axially past the shoulder of said second member; and said second member having opposed apertures and latches extending into said apertures and said cavity and being movable to engage said first projection for retaining said first member and said second member together.

13. A fuel tank assembly as set forth in claim 12 wherein said second member has a passageway communicating with said cavity.

14. A fuel tank assembly as set forth in claim 13 wherein said latches and said second member are integral.

15. A fuel tank assembly as set forth in claim 13 wherein said second member is molded of a polymer material.

16. A fuel tank assembly as set forth in claim 12 wherein said second member has a body and a connector portion extending from said body.

17. A fuel tank assembly as set forth in claim 16 wherein said connector portion extends axially from said body.

18. A fuel tank assembly as set forth in claim 16 wherein said connector portion is disposed at an angle to a remainder of said body.

19. A fuel tank assembly as set forth in claim 18 wherein said angle is between approximately forty-five degrees and approximately ninety degrees.

20. A fuel tank assembly comprising:

a fuel tank;

a fuel pump module disposed inside of said fuel tank a cover attached to said fuel tank;

a first conduit disposed inside of said fuel tank and connected to said cover and a second conduit disposed inside of said fuel tank and connected to said fuel pump module;

a first member disposed inside of said fuel tank and connected to said first conduit, said first member having a first projection extending outwardly and a second projection extending outwardly and spaced axially between said first projection and one end thereof;

a second member disposed inside of said fuel tank and connected to said second conduit, said second member having a cavity to receive said second projection;

a seal ring disposed in said cavity between said second projection and a shoulder of said second member forming a bottom of said cavity to engage said first member;

said first member having a reduced diameter end extending axially from said second projection and axially past the shoulder of said second member; and said second member having opposed apertures and latches extending into said apertures adjacent said cavity and being movable to engage said first projection for retaining said first member and said second member together.

* * * * *